US012196229B2

(12) United States Patent
Zhu et al.

(10) Patent No.: US 12,196,229 B2
(45) Date of Patent: Jan. 14, 2025

(54) UNLOADING VALVE AND COMBINED VALVE TYPE BUFFER CYLINDER

(71) Applicant: QINGDAO ACME INNOVATION TECHNOLOGY CO., LTD., Qingdao (CN)

(72) Inventors: Dewei Zhu, Qingdao (CN); Xiaoyu Rong, Qingdao (CN)

(73) Assignee: QINGDAO ACME INNOVATION TECHNOLOGY CO., LTD., Qingdao (CN)

( * ) Notice: Subject to any disclaimer, the term of this patent is extended or adjusted under 35 U.S.C. 154(b) by 41 days.

(21) Appl. No.: 18/008,975

(22) PCT Filed: Aug. 10, 2021

(86) PCT No.: PCT/CN2021/111710

§ 371 (c)(1),
(2) Date: Dec. 8, 2022

(87) PCT Pub. No.: WO2022/095530

PCT Pub. Date: May 12, 2022

(65) Prior Publication Data

US 2023/0296116 A1 Sep. 21, 2023

(30) Foreign Application Priority Data

Nov. 4, 2020 (CN) ........................ 202011215331.9
Nov. 4, 2020 (CN) ........................ 202022516668.5

(51) Int. Cl.
*F15B 21/00* (2006.01)
*F15B 13/02* (2006.01)

(52) U.S. Cl.
CPC ............ *F15B 13/02* (2013.01); *F15B 21/008* (2013.01)

(58) Field of Classification Search
CPC ...... F15B 15/204; F15B 14/15; F15B 15/222; F15B 21/008; F15B 15/22
See application file for complete search history.

(56) References Cited

U.S. PATENT DOCUMENTS 3,845,694 A 11/1974 Berg
6,805,148 B2 10/2004 Progin et al.
(Continued)

FOREIGN PATENT DOCUMENTS

CN 101475022 A 7/2009
CN 201593537 U 9/2010
(Continued)

*Primary Examiner* — Kenneth Bomberg
*Assistant Examiner* — Daniel S Collins
(74) *Attorney, Agent, or Firm* — Bayramoglu Law Offices LLC

(57) ABSTRACT

An unloading valve includes a valve body, a valve trim, a return spring, a damping hole, and an unloading groove. A combined valve includes the unloading valve and a throttling valve. The throttling valve includes a buffer stopper and a buffer chamber. A piston rod assembly of the combined valve type buffer cylinder is provided in a cylinder body. The cylinder body includes a cylinder head flange, a cylinder bottom, and a cylinder barrel. The piston rod assembly includes a guide sleeve, a piston, and a piston rod. The combined valve is provided on the cylinder. The system is located in an unloading state in a buffering process to reduce the energy loss and heat buildup of the system, prevent the pressure impact of buffering on the system, make the system more reliable, and lower the difficulty of the original buffer valve in performance matching, installation and debugging.

16 Claims, 10 Drawing Sheets

Enlarged B

(56) References Cited

U.S. PATENT DOCUMENTS

| | | | | |
|---|---|---|---|---|
| 10,738,802 | B2 * | 8/2020 | Zhu | F16F 9/19 |
| 2008/0289486 | A1 * | 11/2008 | Kobayashi | F15B 15/222<br>92/143 |

FOREIGN PATENT DOCUMENTS

| | | | |
|---|---|---|---|
| CN | 102537636 | A | 7/2012 |
| CN | 202419103 | U | 9/2012 |
| CN | 103438050 | A | 12/2013 |
| CN | 203441863 | U | 2/2014 |
| CN | 103912534 | A | 7/2014 |
| CN | 104074837 | A | 10/2014 |
| CN | 104389850 | A | 3/2015 |
| CN | 105889173 | A | 8/2016 |
| CN | 108757974 | A | 11/2018 |
| CN | 111927848 | A | 11/2020 |
| CN | 212250685 | U | 12/2020 |
| CN | 112196861 | A | 1/2021 |
| DE | 102017008359 | A1 | 3/2019 |
| EP | 1001174 | A1 | 5/2000 |
| JP | H01131304 | A | 5/1989 |
| JP | H0431303 | U | 3/1992 |
| JP | H08128405 | A | 5/1996 |
| JP | 2001343079 | A | 12/2001 |

* cited by examiner

Enlarged A

Enlarged B

UNLOADING VALVE AND COMBINED VALVE TYPE BUFFER CYLINDER

CROSS REFERENCES TO THE RELATED APPLICATIONS

The application is the national phase entry of International Application No. PCT/CN2021/111710, filed on Aug. 10, 2021, which is based on and claims priority to Chinese patent application No. 202011215331.9, filed on Nov. 4, 2020, and Chinese patent application No. 202022516668.5, filed on Nov. 4, 2020, the entire contents of which are incorporated herein by reference.

TECHNICAL FIELD

The present disclosure relates to the field of hydraulic cylinders and hydraulic valves and in particular to an unloading valve and a combined valve type buffer cylinder.

BACKGROUND

Engineering machinery is generally provided with a medium and high-pressure heavy-duty cylinder, which works at high pressure and the reciprocating component must overcome large inertia. Hence, at the end of the travel of the frequent reciprocation of the cylinder piston, there is often a large mechanical impact to cause faults. Meanwhile, the accompanying large hydraulic impact may cause the hydraulic system to break down. Presently, it is a common practice to add a buffer mechanism on the cylinder. Specifically, a buffer chamber is provided at the end of the cylinder where the travel of the piston ends, and a buffer stopper is provided on a piston rod. When the cylinder piston moves close to the end of travel, the buffer stopper enters the buffer chamber and blocks an oil return orifice to form a throttling effect, resulting in an increase in the pressure in an oil return chamber, and then the moving velocity of the piston is lowered with an oil return backpressure, thereby reducing the mechanical impact of the piston at the end of travel, and buffering the cylinder (refer to patents: 201020114293.3, 201410332785.2, and 201410560827.8).

Though the mentioned method reduces the mechanical impact strength of the cylinder piston and achieves a certain buffering effect to some extent, it has the following defects. The pressure in the oil inlet chamber of the cylinder is not relieved in the buffering process. While the movement of the piston is stopped through the throttling of the oil return chamber, the oil inlet chamber at the other end of the piston still provides power for the piston continuously. The system pressure is increased with a sudden rise of the buffering pressure to form a pressure impact, which leads to unnecessary power consumption and energy waste of the oil inlet chamber, exacerbates the heat buildup of the system, and affects the buffering effect.

For patents CN201610419750.1, CN202010751295.1 and CN202021559346.2, a buffer valve is provided to control the throttling of the oil return chamber and the unloading of the oil inlet chamber, which effectively solves the mentioned problems in the art. However, the throttling control is mainly accomplished by a valve trim of the buffer valve. A small amount of oil is separated from a cylinder chamber through an individual annunciator to take as output signal oil to control the movement of the valve trim, thereby dynamically regulating the sizes of a throttling orifice and an unloading orifice in the buffer valve. Due to a small amount of the signal oil and a variety of sensitive factors affecting the flow and pressure of the signal oil, the buffer valve cannot achieve the desirable throttling control effect, and it is prone to large pressure fluctuation causing the valve trim to move up and down and resulting in poor stability of the throttling orifice. Moreover, the fluctuations of the throttling orifice and the unloading orifice in the buffer valve are adverse to the signal oil for controlling the valve trim, thereby further affecting the stability of the buffer valve and the regulation quality of the throttling orifice. Besides, the disturbance resistance of the valve is desired to be improved. When the abnormal movement of the valve trim arising from the pressure fluctuations exceeds a certain amplitude to cause oil return throttling in the normal operation process of the cylinder, the differential pressure generated by the throttling further allows the valve trim to move continuously toward an undesirable direction, which poses the failed operation of the buffer valve and affects normal use of the cylinder. To sum up, the spring stiffness, the buffer valve throttling orifice, the unloading orifice, the damping hole, the cross-sectional area of the signal chamber, or the other factors all affect the dynamic performance and stability of the buffer valve and it is difficult to perfectly adapt all factors. Further, the degree of overregulation of the valve trim is hardly controlled, causing the buffer valve to be regulated in a complicated manner, such that the buffer quality and stability are desired to be improved greatly. Furthermore, the valve trim cannot be designed with a small diameter because its diameter is associated with the flow of the main oil passage. Therefore, the diameter of the valve trim as well as the structure of the valve are made larger. Given the complicated structure, difficult arrangement, and high cost, improvements should be made.

SUMMARY

The main objective of the present disclosure is to provide an unloading valve and a combined valve type buffer cylinder to solve the problems in the prior art.

To achieve the above objective, the present disclosure adopts the following technical solutions:

An unloading valve includes a valve body, a valve trim, and a return spring. A valve orifice is formed in the valve body. The valve trim is fit and provided in the valve orifice. A driving chamber of the valve trim and a spring chamber of the valve trim are respectively formed at two ends of the valve orifice. The return spring is provided in the spring chamber and includes one end compressed to abut against the bottom of the spring chamber and the other end compressed to abut against one end of the valve trim. Under the pushing force of the return spring, the other end of the valve trim abuts the bottom of the driving chamber. An unloading groove is formed in the valve trim. An oil passage I and an oil passage II that can communicate through the unloading groove are arranged on the valve body. An oil passage III communicating with the driving chamber is formed in the valve body. The oil passage II communicates with the spring chamber. In a non-unloading state, the unloading groove communicates with the oil passage I, rather than the oil passage II, the spring chamber, and the driving chamber.

Further, an oil passage IV communicating with the spring chamber is formed in the valve body.

Further, the unloading valve includes a damping hole. The damping hole is formed in the valve trim, a guide sleeve, a cylinder bottom, or an oil conduit. The driving chamber and the spring chamber communicate through the damping hole.

Further, the unloading groove includes an annular groove around the surface of the valve trim and/or axial cutting grooves recessed along the surface of the valve trim, and the axial cutting grooves are arranged along the circumferential direction of the valve trim.

Further, the unloading valve is integrated into the guide sleeve of a cylinder or the cylinder bottom.

Further, the unloading valve is assembled on the guide sleeve, the cylinder bottom, or the oil conduit.

Further, the unloading valve is a cartridge valve.

Further, the unloading valve includes a valve sleeve. The valve trim is fit and provided in the valve sleeve and inserted into the valve body through the valve sleeve. An oil passage V is formed in the valve sleeve and configured to cooperate with the unloading groove to realize an unloading function of the unloading valve.

A combined valve type buffer cylinder includes a guide sleeve, where the guide sleeve is in sliding fit with a piston rod. A piston is fixedly connected to the piston rod. The piston divides an inner cavity of a cylinder body into two cylinder chambers. The buffer cylinder further includes combined valves. The combined valves each include a throttling valve and the unloading valve that cooperate when in use. The throttling valve includes a buffer stopper and a buffer chamber. The buffer stopper is provided on the piston rod. The buffer chamber is formed at an end of the cylinder body. The buffer chamber further serves as an oil inlet and outlet channels for the cylinder chamber at the end of the cylinder body and communicates with the spring chamber of the unloading valve. The spring chamber communicates with the system oil conduit through the oil passage II. The driving chamber of the unloading valve communicates with the cylinder chamber at the buffer chamber of the cylinder body through the oil passage III. The unloading groove of the unloading valve always communicates with the other cylinder chamber through the oil passage I.

Further, the spring chamber communicates with the cylinder chamber at the buffer chamber of the cylinder body through the oil passage IV.

Further, two combined valves cooperate and respectively control buffering at two ends of the cylinder.

Further, two unloading valves of the two combined valves are provided independently.

Further, the two unloading valves of the two combined valves are integrated together, and the spring chamber of the valve trim of each of the unloading valves communicates with the unloading groove of the other one of the unloading valves.

Further, the combined valve type buffer cylinder includes a one-way valve.

Further, the one-way valve is provided on the throttling valve. The one-way valve includes an oil filling gap formed between an inner hole of the buffer stopper and a mating surface of the piston rod. An end surface oil groove formed at an end of the buffer stopper toward the piston. A one-way valve orifice is composed of shoulders, which are provided correspondingly on the buffer stopper and the piston rod and cooperate.

Further, the one-way valve is provided on the valve trim. The one-way valve includes a one-way valve trim and a one-way valve spring. The damping hole of the unloading valve is formed in the one-way valve trim. A central oil passage is formed in the valve trim. The one-way valve trim is provided at an opening of the central oil passage in the valve trim. The one-way valve spring is compressed at the bottom of the driving chamber. In a normal state, the one-way valve trim abuts the opening of the central oil passage under a pushing force of the one-way valve spring, and the one-way valve orifice is closed.

Further, a throttling groove is formed in the buffer stopper, and the throttling groove is a chamfered planar groove or a longitudinal groove along the surface of the valve trim.

The present disclosure has the following beneficial effects.

(1) The unloading valve performs unloading on an oil inlet chamber of the cylinder to reduce the pressure of the oil inlet chamber and the power of the piston, which effectively prevents unnecessary power consumption and heat buildup of the system, reduces a pressure impact of the system, protects the hydraulic system, and achieves a better cylinder buffering effect.

(2) The combined valve realizes the throttling function and the unloading function separately and controls the unloading valve through the throttling valve. The throttling valve throttles the oil return chamber of the cylinder while controlling the unloading valve with a differential throttling pressure.

(3) Compared with the conventional hydraulic cylinder, the hydraulic buffer cylinder increases the unloading function of the oil inlet chamber, achieves the desirable buffering effect, and reduces the buffering pressure. In the present disclosure, the system is located in an unloading state in a buffering process, thus the energy loss and heat buildup in the system is reduced, the pressure impact of the buffering on the system is prevented, and the system is more reliable.

(4) Compared with patents CN201610419750.1, CN202010751295.1, and CN202021559346.2 in which the unloading function is also achieved, the present disclosure provides a modified buffer device as a combination of cooperating throttling valve and unloading valve, such that the buffering control is more stable and simpler, the buffering quality is further improved, and the structure is simplified. Since a large amount of oil turns out to be unnecessary for the trim of the unloading valve, a small valve trim can be designed with a small size, lower control requirements, and simple control. Consequently, the valve has better performance, higher reliability, and small leakage. According to the present disclosure, the function of the signal chamber in the above patents is transformed into the throttling function. The buffer chamber instead of the signal chamber serves as the hydraulic oil inlet and outlet channel of the cylinder chamber at the same time. The signal stopper is replaced by the buffer stopper. Throttling control is realized through the cooperation between the buffer stopper and the buffer chamber, such that the original method which regulates the throttling orifice by moving the valve trim based on the signal oil is abandoned, and large fluctuations of the buffering pressure from the movement of the valve trim are prevented. By changing the control oil conduit and the control method of the valve trim and directly controlling the movement of the valve trim with the pressurized oil in the oil return chamber and the buffering pressure, the method for generating the signal oil, oil source, amount of oil, control sensitivity, and control requirements are all changed, which improves the control quality, eliminates the false operation of the valve trim of the buffer valve in normal work of the cylinder in the original technology, can unload the pressurized oil in the oil inlet chamber of the cylinder quickly through the unloading groove of the valve trim, and realizes unloading and buffering functions for the oil inlet chamber of the cylinder.

(5) The present disclosure comprehensively utilizes the advantages of the above patents and makes structural improvements to overcome the shortcomings of the prior art, such that the structural performance is better, and the buffering quality is further improved. Meanwhile, the present disclosure lowers the difficulty of the original buffer valve in performance matching, installation and debugging, with a simple process, a lower manufacturing difficulty, and a higher reliability.

Figure 1:
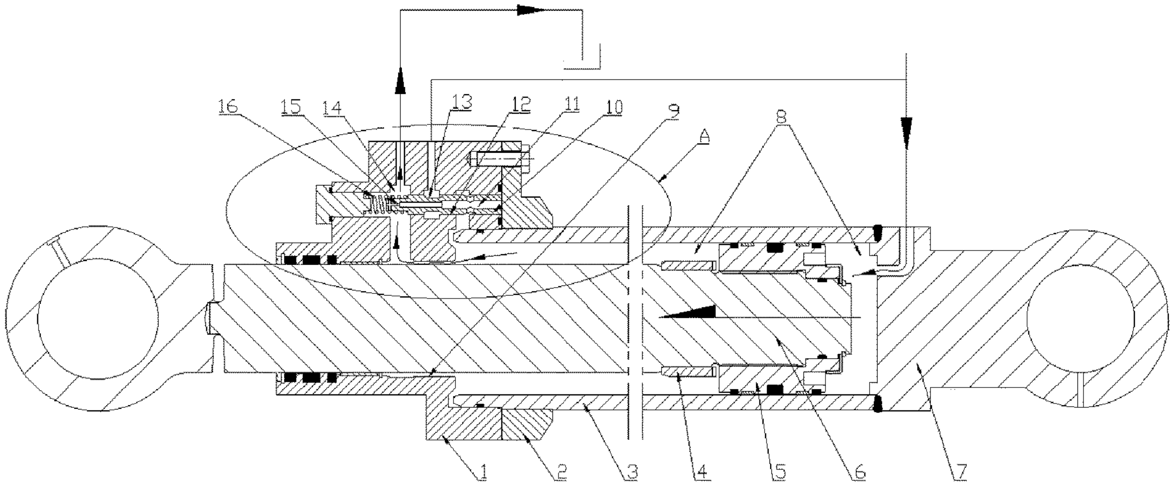
FIG. 1 is a schematic structural view according to Embodiment 1 of the present disclosure, where an unloading valve is provided in a guide sleeve and a piston moves from a cylinder bottom to the guide sleeve.

In the figures: 1: guide sleeve, 2: cylinder head flange, 3: cylinder barrel, 4: buffer stopper, 4-1: throttling groove, 5: piston, 6: piston rod, 7: cylinder bottom, 8: cylinder chamber, 9: buffer chamber, 10: valve trim, 11: driving chamber, 12: valve orifice, 13: unloading groove, 14: spring chamber, 15: damping hole, 16: return spring, 17: throttling orifice, 18: end surface oil groove, 19: oil filling gap, 20: one-way valve orifice, 21: one-way valve trim, 22: one-way valve spring, 23: valve sleeve, 24: oil passage I, 25: oil passage II, 26: oil passage III, 27: oil passage IV, 28: oil passage V, and X: unloading valve.

DETAILED DESCRIPTION OF THE EMBODIMENTS

The present disclosure will be further described below by referring to the accompanying drawings.

Embodiment 1

As shown in FIGS. 1-4, an unloading valve is provided. The unloading valve is integrated into a guide sleeve of a cylinder and cooperatively used with the cylinder, thereby realizing the unloading and buffering functions of the cylinder. The unloading valve includes a valve body, valve trim 10, and return spring 16. Valve orifice 12 is formed in the valve body. The valve trim is fit and provided in the valve orifice. Driving chamber 11 of the valve trim and spring chamber 14 of the valve trim are respectively formed at two ends of the valve orifice. The return spring is provided in the spring chamber and includes one end compressed to abut against the bottom of the spring chamber and the other end compressed to abut against one end of the valve trim. Under a pushing force of the return spring, the other end of the valve trim abuts a bottom of the driving chamber. Damping hole 15 and unloading groove 13 are further formed in the valve trim. The driving chamber and the spring chamber of the valve orifice communicate through the damping hole. The driving chamber further communicates with corresponding cylinder chamber 8 through oil passage III 26. The cylinder chamber may further communicate with the corresponding spring chamber through oil passage IV 27. The spring chamber communicates with a system oil conduit through oil passage II 25. The unloading groove of the corresponding valve trim communicates with an oil passage of another cylinder chamber. The unloading valve is further provided with oil passage I 24. The oil passage I 24 can communicate with the oil passage II 25 through the unloading groove.

When the valve trim is kept at the bottom of the driving chamber under the pushing force of the return spring, the unloading groove of the unloading valve is sealed completely by the valve orifice, which cuts off communication of the unloading groove with other chambers of the unloading valve, protects normal oil supply and discharge of the cylinder chamber at the cylinder bottom in a non-buffering working state from being affected by the unloading valve, and maintains the normal working state of the cylinder.

A combined valve includes a throttling valve and an unloading valve. The throttling valve includes a buffer stopper and a buffer chamber. The buffer stopper is provided on a piston rod. The buffer chamber is formed in a guide sleeve. The buffer chamber serves as a hydraulic oil inlet into and outlet channels from a corresponding cylinder chamber and communicates with a spring chamber of the unloading valve. The spring chamber further communicates with a system oil conduit through an oil passage II. Correspondingly, a driving chamber of the unloading valve communicates with a corresponding cylinder chamber. An unloading groove of the unloading valve always communicates with another cylinder chamber.

A combined valve type buffer cylinder is only provided with a combined valve in a cylinder chamber at a guide sleeve. The combined valve includes a throttling valve and an unloading valve. The throttling valve is provided in the cylinder chamber at the guide sleeve. The unloading valve is integrated into the guide sleeve. Buffer stopper 4 of the throttling valve is provided on the piston rod. A buffer chamber is formed in the guide sleeve and can buffer the cylinder at the guide sleeve. The cylinder mainly includes a cylinder body, piston 5, and the piston rod 6. The cylinder body includes the guide sleeve 1, cylinder head flange 2, cylinder bottom 7, and cylinder barrel 3. The cylinder head flange and the cylinder bottom are respectively and fixedly connected to two ends of the cylinder barrel. The guide sleeve is fixed on the cylinder head flange. The piston is fixedly connected to the piston rod with a sliding fit in the cylinder barrel. The guide sleeve is in sliding fit on the piston rod and limits the piston in the cylinder body. The piston divides an inner cavity of the cylinder body into two cylinder chambers, which are respectively located at the guide sleeve and the cylinder bottom and taken as an oil inlet chamber and an oil return chamber of the cylinder.

When the valve trim is kept at the bottom of the driving chamber of the corresponding valve orifice under the action of the return spring, the unloading groove of the valve trim is sealed by the valve orifice. When moving to the bottom of the oil return chamber with the piston, the buffer stopper enters the corresponding buffer chamber and stops an oil return channel of the oil return chamber to form throttling orifice 17. Hydraulic oil in the oil return chamber is forced to flow back to an oil tank from the throttling orifice and the damping hole of the unloading valve, such that the pressure in the oil return chamber rises to stop the movement of the piston, thereby buffering the cylinder through the throttling and backpressure of the oil return chamber. While the pressure in the oil return chamber rises, the pressure in the driving chamber of the valve trim of the unloading valve communicating with the oil return chamber is increased. In this case, the spring chamber at the other end of the valve trim of the unloading valve returns oil at low pressure. Consequently, a differential pressure is generated between the driving chamber and the spring chamber at two ends of the valve trim of the unloading valve to drive the valve trim to overcome the resistance of the return spring to move toward the low-pressure spring chamber. The unloading groove of the valve trim communicates with the spring chamber. High-pressure oil in the oil inlet chamber is returned and unloaded through the unloading groove and the spring chamber, thus realizing the unloading and buffering of the oil inlet chamber.

Figure 2:
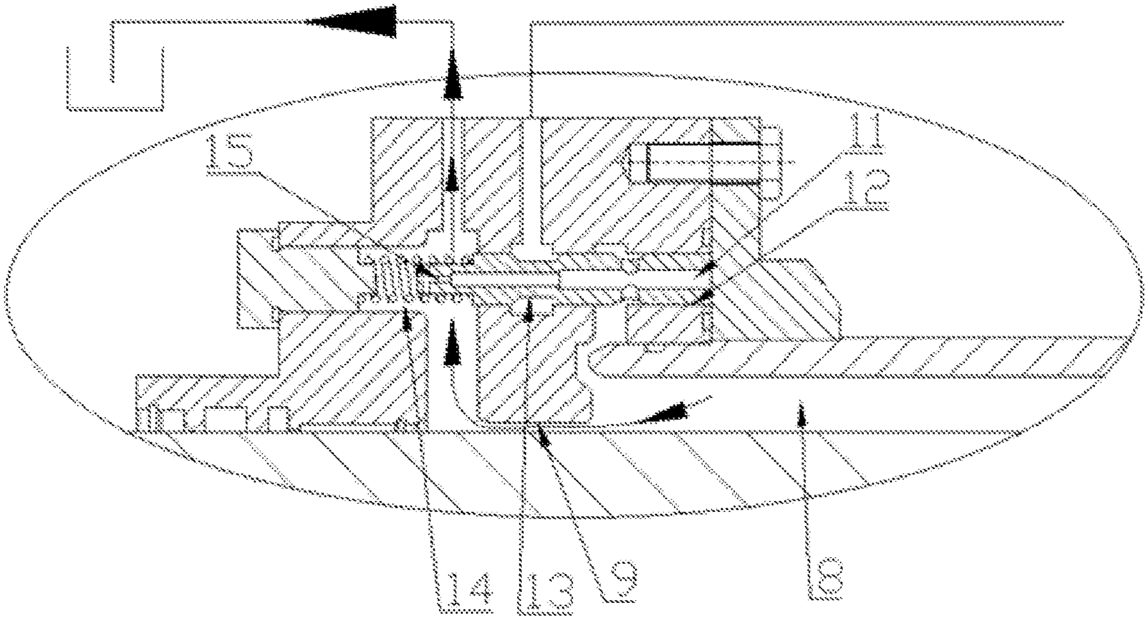
FIG. 2 is an enlarged view of A in FIG. 1.
Figure 3:
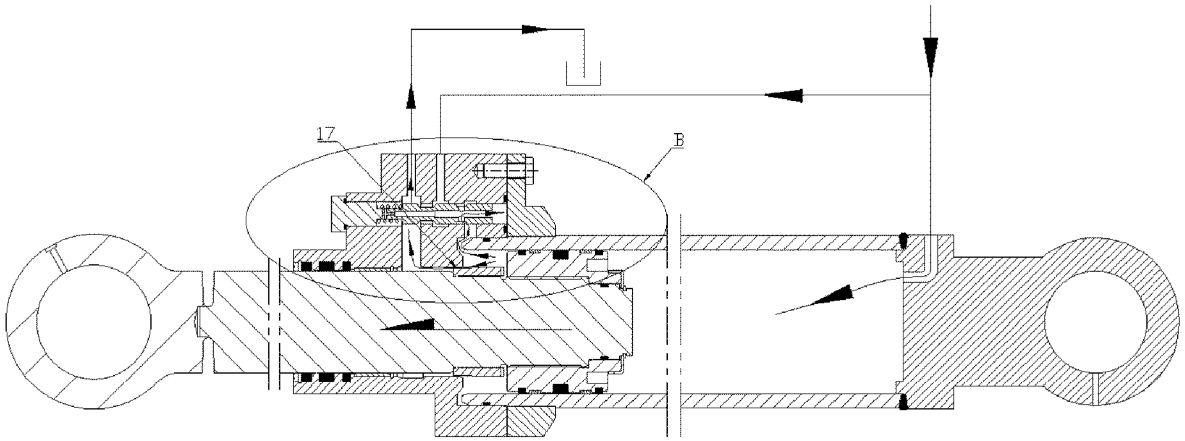
FIG. 3 is a schematic structural view illustrating that a cylinder is buffered when the piston moves to an end of travel in Embodiment 1.
Figure 4:
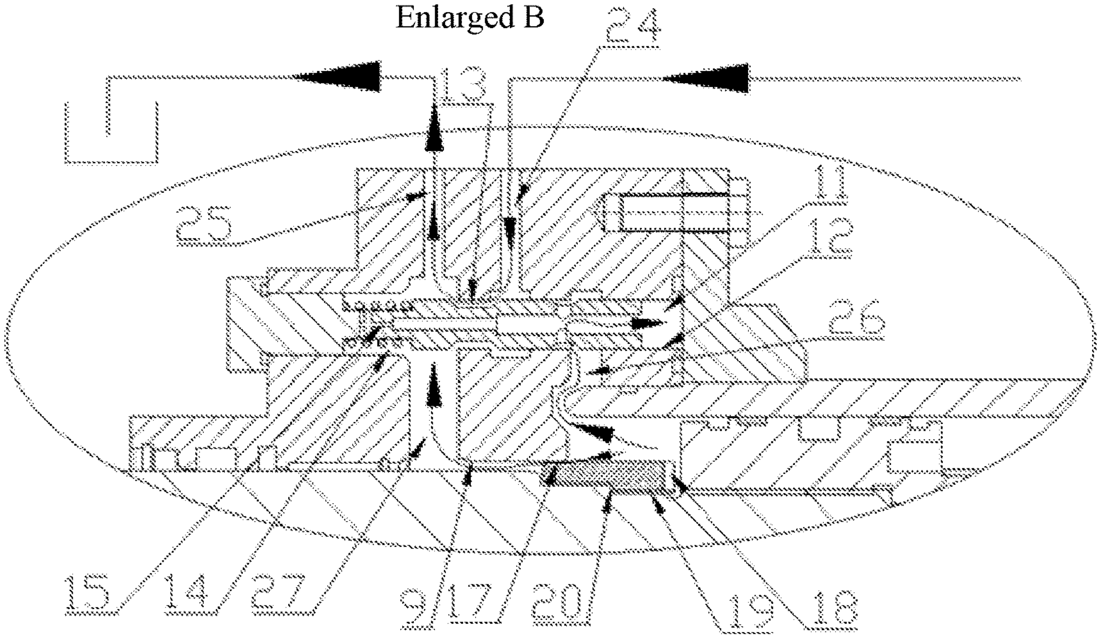
FIG. 4 is an enlarged view of B in FIG. 3.

The combined valve type buffer cylinder has the following working principle: As shown in FIG. 1, when the cylinder chamber at the cylinder bottom serves as the oil inlet chamber to charge high-pressure oil, the piston pushed by the high-pressure oil drives the buffer stopper to move toward the guide sleeve (as shown by arrows in FIG. 1). Meanwhile, the cylinder chamber at the guide sleeve serves as the oil return chamber to return oil. In the case of low pressure, the oil in the oil return chamber flows back to the oil tank (as shown in FIG. 2). Further, when moving close to an end of travel with the piston (as shown in FIG. 3), the buffer stopper enters the buffer chamber to form the throttling orifice 17 (as shown in FIG. 4) and stops the oil return channel of the oil return chamber. The hydraulic oil in the oil return chamber is forced to flow back to the oil tank from the throttling orifice and the damping hole of the unloading valve, such that the pressure in the oil return chamber rises, and an oil return backpressure is generated to stop the movement of the piston and lower the moving velocity of the piston, thereby buffering the cylinder through the throttling and backpressure of the oil return chamber. While the pressure in the oil return chamber rises, the pressure in the driving chamber of the valve trim communicating with the oil return chamber is increased. The spring chamber at the other end of the valve trim communicates with the oil tank and returns oil at low pressure. Consequently, the pressure in the driving chamber of the valve trim is higher than that in the spring chamber of the valve trim. The valve trim is driven to overcome the resistance of the return spring to slide toward the low-pressure spring chamber. The unloading groove of the valve trim gradually moves toward the spring chamber of the valve trim and communicates with the spring chamber. For the oil inlet chamber (namely the cylinder chamber at the cylinder bottom) in a high-pressure oil supply state, pressurized oil is unloaded by communicating the unloading groove of the valve trim with the spring chamber of the valve trim (as shown in FIG. 4), thereby lowering the pressure in the oil inlet chamber, reducing the pushing force of the oil inlet chamber to the piston, and lowering the moving velocity of the piston. Through the throttling and backpressure of the oil return chamber and the high-pressure unloading of the oil inlet chamber, the cylinder is buffered efficiently. Further, when the piston stops at the end of travel, the buffering process is complete. A high-pressure driving force from the driving chamber of the valve trim disappears. The valve trim is restored to the bottom of the driving chamber under the pushing force of the return spring. The unloading groove of the valve trim is sealed by the valve orifice (as shown in FIG. 2). The unloading channel is closed. The cylinder is restored to a normal working state.

Embodiment 2

Figure 5:
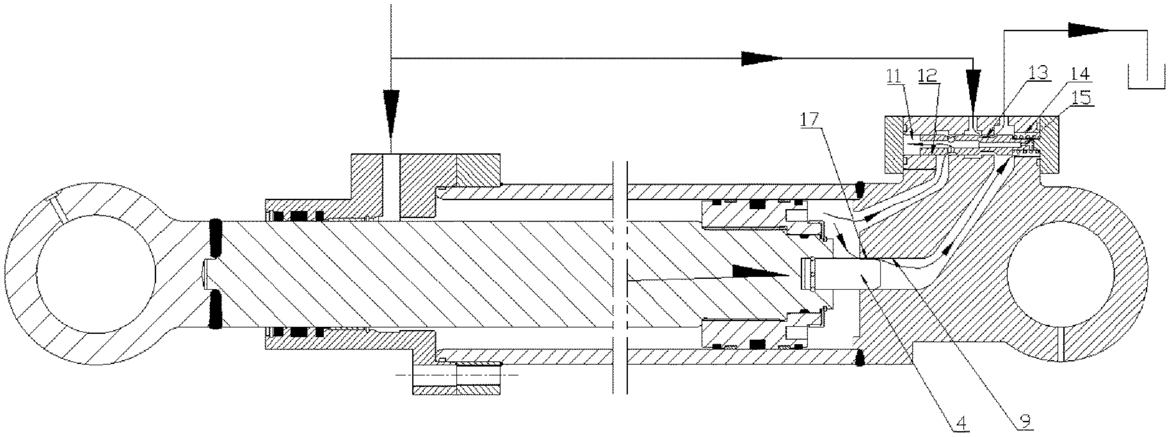
FIG. 5 is a first schematic structural view according to Embodiment 2, where an unloading valve is provided on a cylinder bottom.
Figure 6:
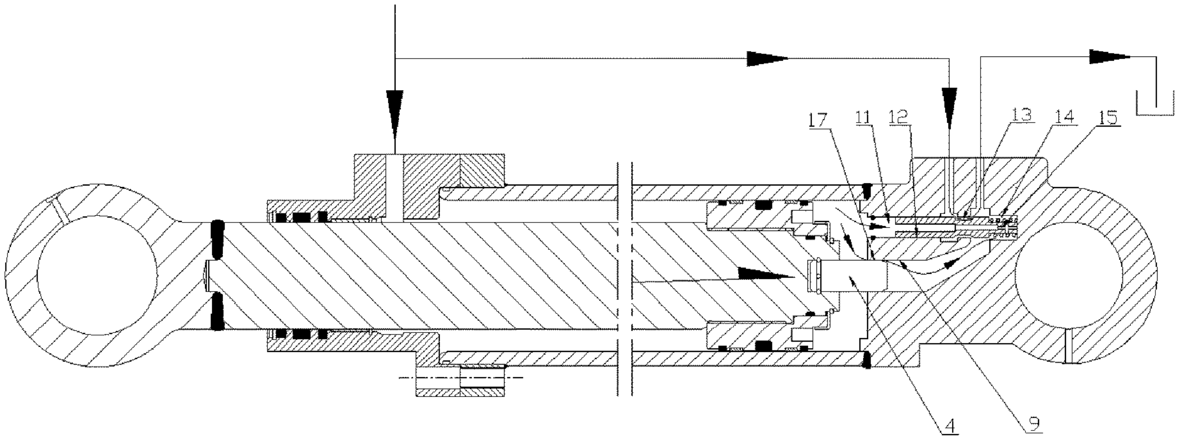
FIG. 6 is a second schematic structural view according to Embodiment 2, where an unloading valve is provided on a cylinder bottom.

As shown in FIG. 5 and FIG. 6, the combined valve type buffer cylinder is only provided with the combined valve in the cylinder chamber at the cylinder bottom. The combined valve is integrated into the cylinder bottom to buffer the cylinder at the cylinder bottom. FIG. 5 and FIG. 6 are structurally similar and differ in the position of the unloading valve. Compared with Embodiment 1, the main differences lie in: Both the valve orifice of the unloading valve and the buffer chamber of the throttling valve are formed in the cylinder bottom. The buffer stopper of the throttling valve is provided at the bottom center of the piston rod. The working principle is similar to Embodiment 1 and will not be repeated herein.

Embodiment 3

Figure 7:
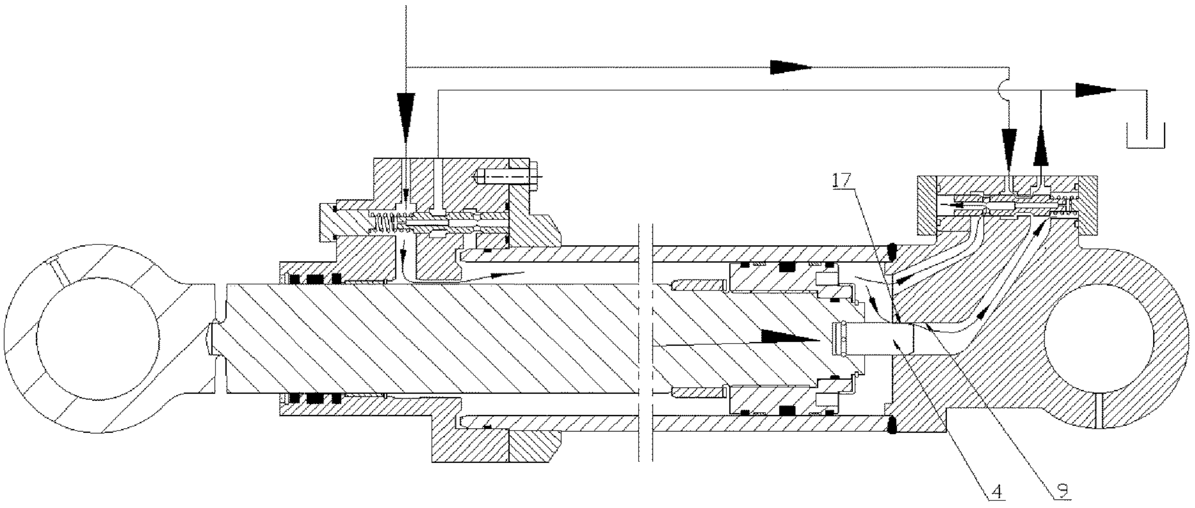
FIG. 7 is a schematic structural view according to Embodiment 3, where an unloading valve is respectively provided in a guide sleeve and a cylinder bottom.

As shown in FIG. 7, the combined valve type buffer cylinder is respectively provided with the combined valve at two ends, which can buffer the cylinder when the piston at any end is close to the end of travel of the cylinder. As a composite structure of Embodiment 1 and Embodiment 2, the embodiment can implement a two-way buffering function of the cylinder. When the cylinder is in operation and the piston is close to the end of travel at a certain end of the cylinder, the combined valve at this end is activated for buffering. The working principle is similar to the foregoing embodiments and will not be repeated herein.

Embodiment 4

Figure 8:
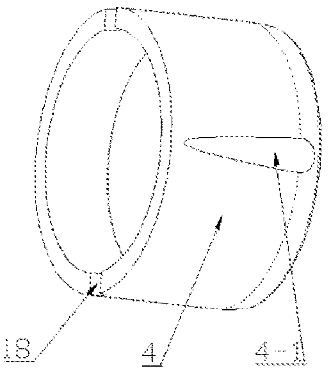
FIG. 8 is a first schematic structural view of an annular buffer stopper according to Embodiment 4.
Figure 9:
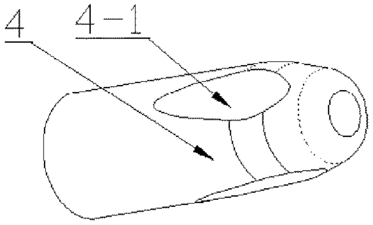
FIG. 9 is a second schematic structural view of a cylindrical buffer stopper according to Embodiment 4.
Figure 13:
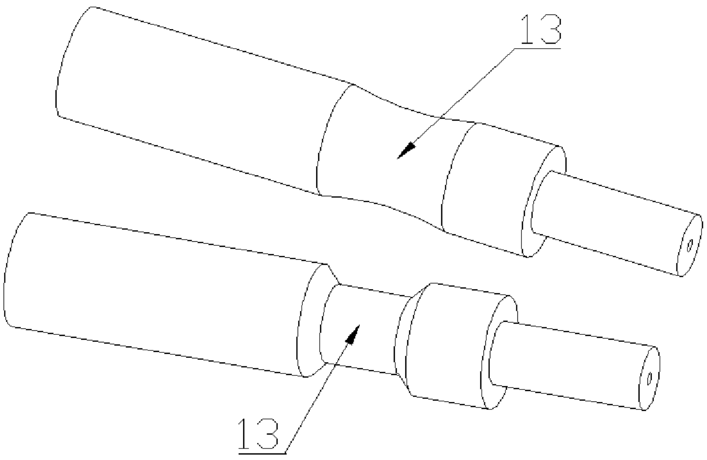
FIG. 13 is a first arrangement of an unloading groove.
Figure 14:
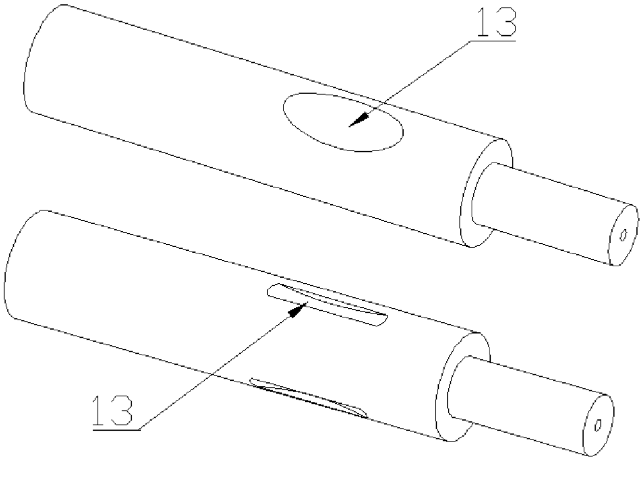
FIG. 14 is a second arrangement of an unloading groove.
Figure 15:
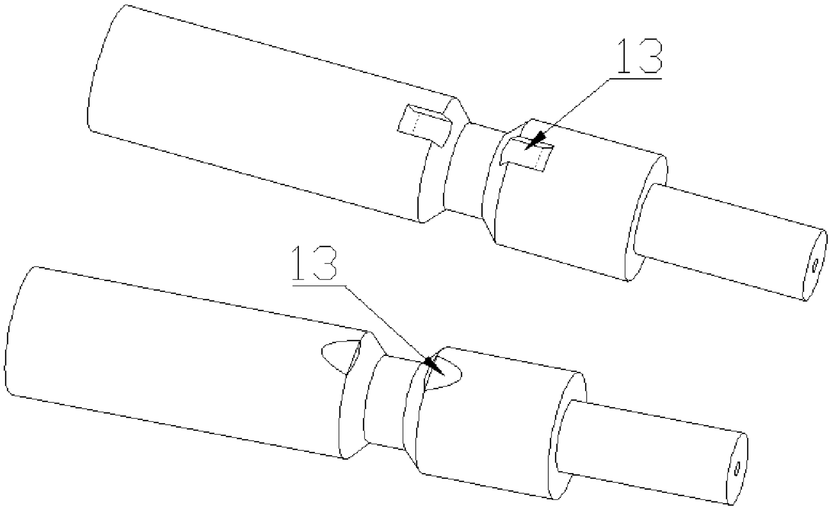
FIG. 15 is a third arrangement of an unloading groove.

As shown in FIG. 8 and FIG. 9, the buffer stopper can be set in a different structural form as required. FIG. 8 illustrates an annular structure, and FIG. 9 illustrates a cylindrical structure. The throttling groove can also be set in a different structural form as required. The throttling groove 4-1 in FIG. 8 and FIG. 9 is a chamfered planar groove in the surface of the buffer stopper and may also be a longitudinal groove such as a triangular groove, a rectangular groove, and an arc groove in the surface of the buffer stopper. In FIGS. 13-15, the unloading groove of the valve trim is provided similarly and will not be repeated herein.

Embodiment 5

The unloading groove of the valve trim can also be set in a different structural form as required. The unloading groove in FIG. 2 is an annular groove around the axis of the valve trim and on the surface of the valve trim. As required, the unloading groove may further be set as other longitudinal grooves like planar grooves, triangular grooves, rectangular grooves, and arc grooves along the surface and may also be set as a composite structure of the annular groove and the longitudinal grooves. FIG. 13 illustrates two types of annular grooves. FIG. 14 illustrates two types of longitudinal grooves. The longitudinal grooves are uniformly and circumferentially arranged on the surface of the valve trim. FIG. 15 illustrates a combination of the annular groove and the longitudinal grooves.

Embodiment 6

Figure 10:
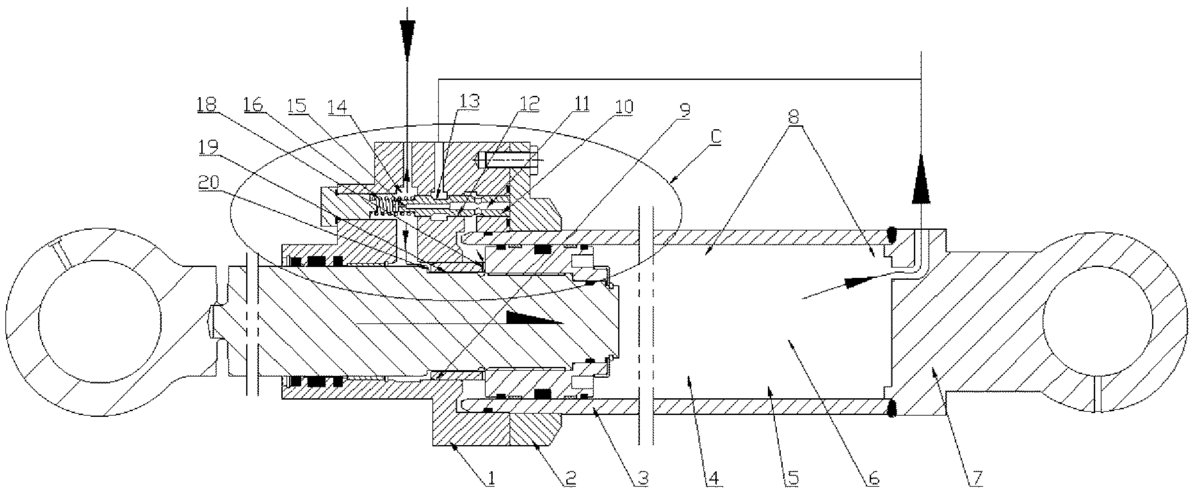
FIG. 10 is a schematic structural view illustrating that hydraulic oil quickly fills a cylinder chamber through a one-way valve when a piston moves reversely upon completion of buffering of a cylinder in FIG. 3.

As shown in FIG. 10, the combined valve in the combined valve type buffer cylinder is provided with a one-way valve. When the piston moves reversely upon completion of the buffering, the hydraulic oil can be quickly filled into the corresponding cylinder chamber through the one-way valve.

Figure 11:
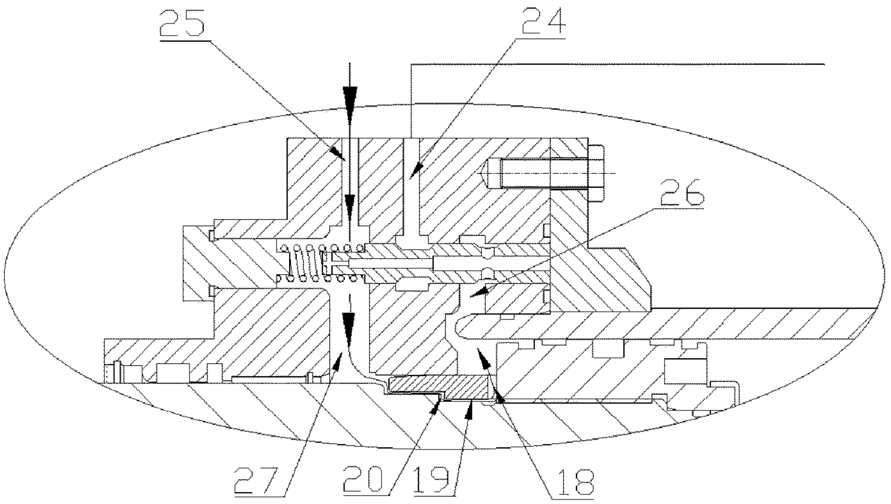
FIG. 11 is an enlarged view of C in FIG. 10 and shows an arrangement of a one-way valve in Embodiment 4.

As shown in FIG. 11, the one-way valve is provided on the throttling valve of the combined valve. The buffer stopper of the throttling valve is provided coaxially on the piston rod. Oil filling gap 19 is formed between an inner hole of the buffer stopper and a mating surface of the piston rod. End surface oil groove 18 is further formed at an end of the buffer stopper toward the piston. When the end surface of the buffer stopper and the end surface of the piston are pressed firmly, the oil filling gap of the buffer stopper can still communicate with the corresponding cylinder chamber through the end surface oil groove. Shoulders that cooperate with each other are provided correspondingly on the buffer stopper and the piston rod to form a one-way valve orifice 20. When the shoulder of the buffer stopper is pressed firmly on the shoulder of the piston rod, the oil conduit in the oil filling gap is cut off, and the one-way valve orifice 20 is closed, as shown in FIG. 4. At the beginning of the buffering, the buffer stopper enters the buffer chamber and stops the oil return channel of the oil return chamber. The pressure in the oil return chamber rises. Under the pressure of the oil return chamber, the shoulder of the buffer stopper is pressed firmly on the shoulder of the piston rod, and the one-way valve orifice 20 is closed, thereby cutting off a channel via which the hydraulic oil in the oil return chamber enters the buffer chamber and the spring chamber through the end surface oil groove 18 of the buffer stopper and the oil filling gap 19. Pressurized oil in the oil return chamber is forced to enter the buffer chamber and the spring chamber through the throttling orifice (as shown in FIG. 4). When the piston moves reversely upon completion of the buffering, the buffer stopper moves toward the piston under an impact of high-pressure oil and firmly presses the end surface of the piston, as shown in FIG. 11. In this case, the one-way valve orifice 20 is opened, and the pressurized oil is quickly injected into the cylinder chamber through the spring chamber, the one-way valve orifice 20, the oil filling gap 19, and the end surface oil groove 18.

Embodiment 7

Figure 12:
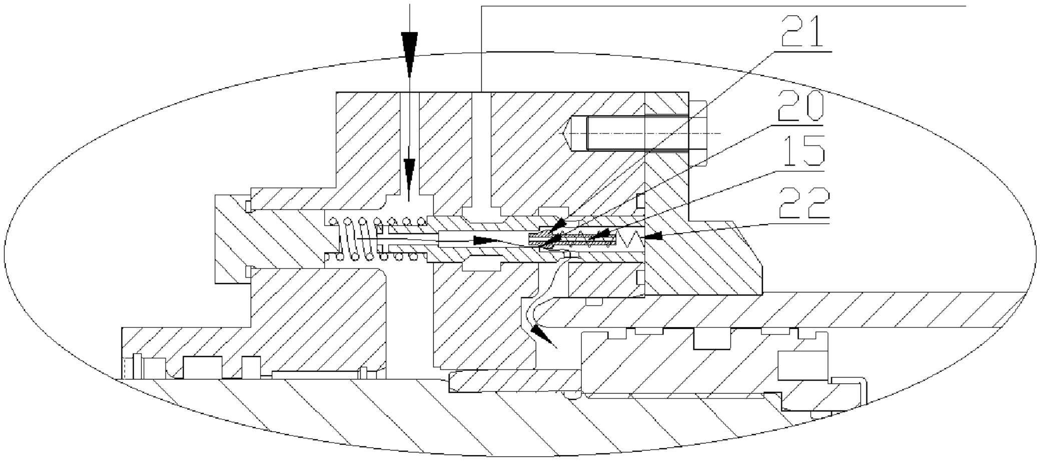
FIG. 12 is an enlarged view of C in FIG. 10 and shows an arrangement of a one-way valve in Embodiment 5.

FIG. 12 illustrates another arrangement for the one-way valve of the combined valve. The embodiment is similar to Embodiment 6, but differs in: The one-way valve is provided on the valve trim of the unloading valve and includes one-way valve trim 21 and one-way valve spring 22. A front end of the one-way valve trim is provided with an outwardly inclined sealing surface. Correspondingly, the damping hole 15 is formed in the one-way valve trim. The one-way valve trim is provided at an opening of a central oil passage of the valve trim of the unloading valve. The one-way valve spring is compressed between one end of the one-way valve trim and the bottom of the driving chamber. Under a pushing force of the one-way valve spring, the one-way valve trim abuts the opening of the central oil passage of the valve trim and the one-way valve orifice is closed. When the piston moves reversely upon completion of the buffering, since the buffer chamber is stopped by the buffer stopper, pressurized oil entering the spring chamber cannot enter the cylinder chamber smoothly through the buffer chamber. The one-way valve trim 21 is only pushed open through the central oil passage of the valve trim of the unloading valve, such that the one-way valve orifice is opened, and the pressurized oil can quickly enter the cylinder chamber through the one-way valve, thereby realizing quick oil filling. As shown in FIG. 12, arrows and thin solid lines are used to illustrate a flow path of incoming oil through the one-way valve. Further, after the buffer stopper moves out of the buffer chamber, the pressurized oil can enter the cylinder chamber smoothly through the buffer chamber. Under the pushing force of the one-way valve spring, the one-way valve trim abuts the opening of the central oil passage of the valve trim again, and the one-way valve orifice is closed (not shown in FIG. 12).

The one-way valve can be provided at different positions flexibly as required. The one-way valve trim can also be set as other equivalent structures, which are not listed herein one by one.

Embodiment 8

Figure 16:
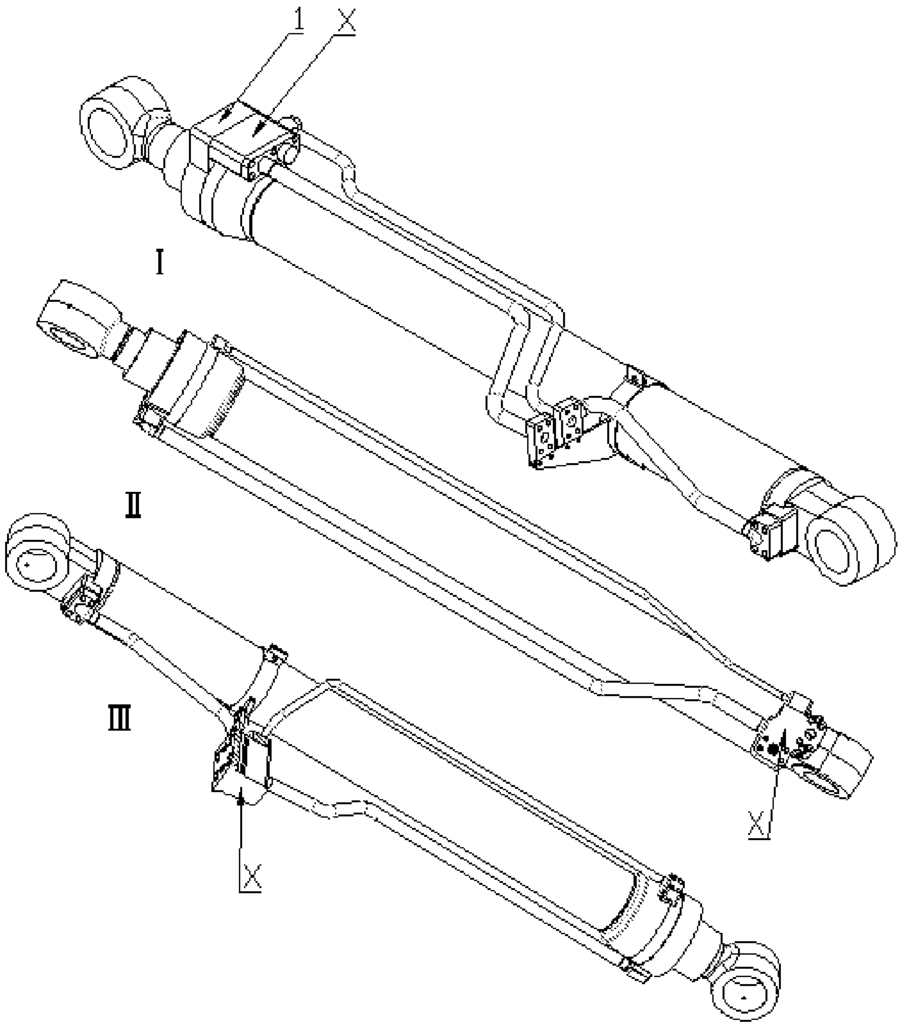
FIG. 16 is a schematic structural view illustrating that an unloading valve is provided outside a cylinder body according to Embodiment 6.
Figure 17:
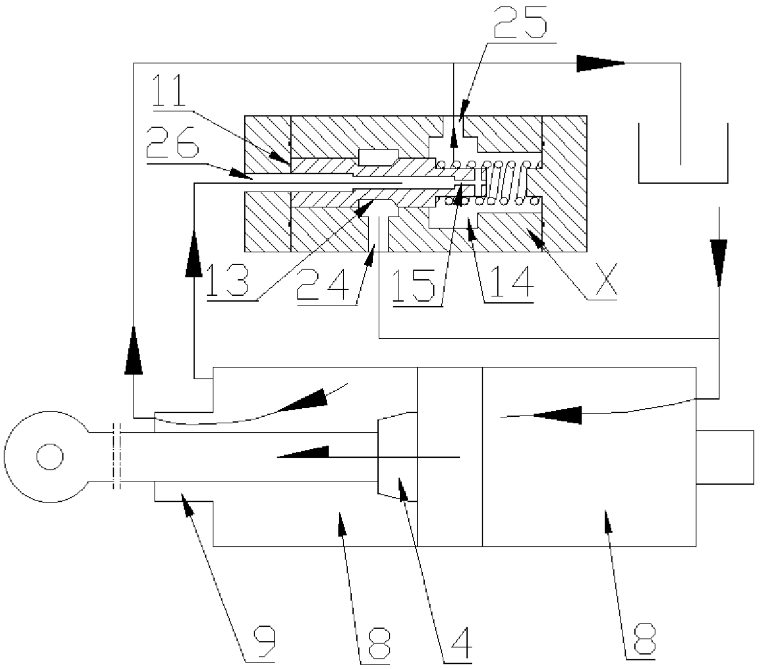
FIG. 17 is a working principle diagram according to the present disclosure and illustrates a structure of a one-way buffer cylinder.

The unloading valve can be provided flexibly as required. FIG. 17 illustrates a working principle diagram of an unloading valve of a one-way buffer cylinder (with the buffering at the guide sleeve as an example). The unloading valve may be externally provided in the guide sleeve, the cylinder bottom, or the oil conduit, and may also be internally integrated into the cylinder body, such as to the guide sleeve, the cylinder bottom, or the cylinder head flange. FIG. 16 shows some specific embodiments of FIG. 17 and illustrates three structures externally provided with the unloading valve. In FIG. 16 I, the unloading valve X as a separate component is independent of the cylinder body and is assembled on the guide sleeve. It is referred to as a singleacting unloading valve. When the cylinder is throttled and buffered at the guide sleeve, the oil inlet chamber at the cylinder bottom can be unloaded through the external unloading valve. In FIG. 16 II, the unloading valve is fixed on the cylinder bottom. In FIG. 16 III, the unloading valve is provided on the oil conduit of the cylinder. FIG. 17 is a working principle diagram of FIG. 16 with arrows showing a flow direction and path of hydraulic oil when the piston moves toward the guide sleeve. The buffering principle is the same as the above and will not be repeated herein.

Embodiment 9

Figure 18:
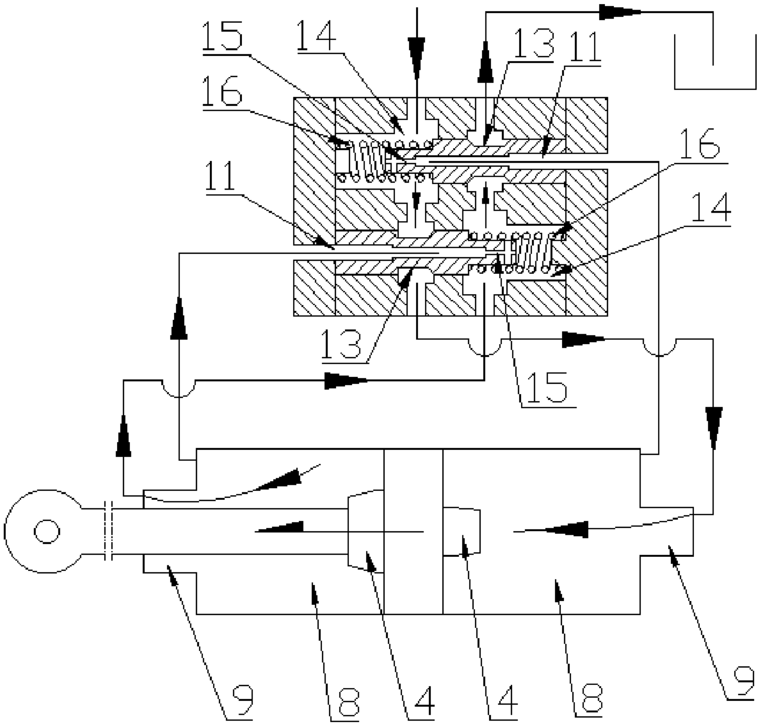
FIG. 18 is a working principle diagram according to the present disclosure and illustrates a structure of a two-way buffer cylinder.
Figure 19:
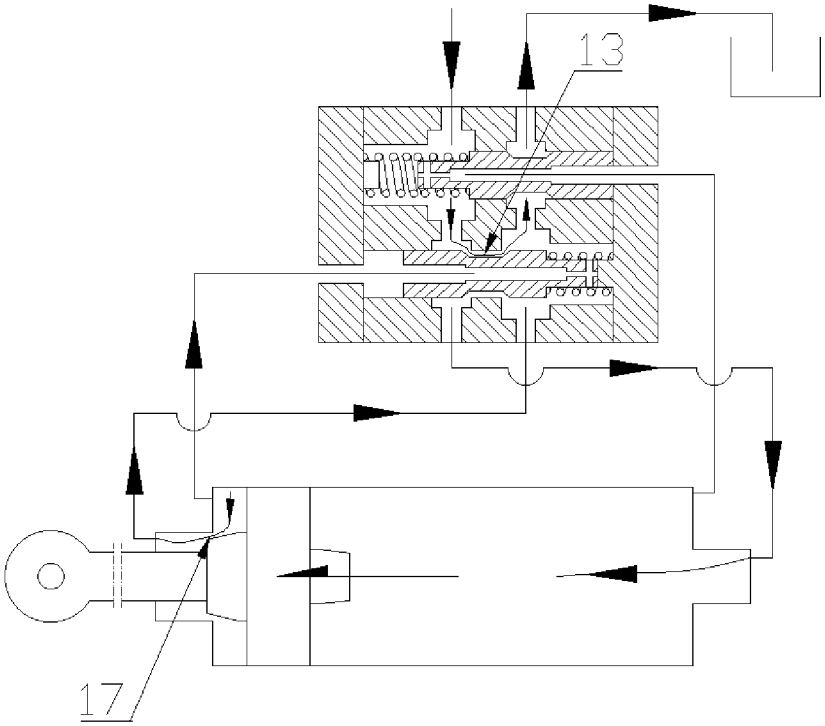
FIG. 19 is a working principle diagram of a valve trim in buffering at a guide sleeve in FIG. 18.
Figure 20:
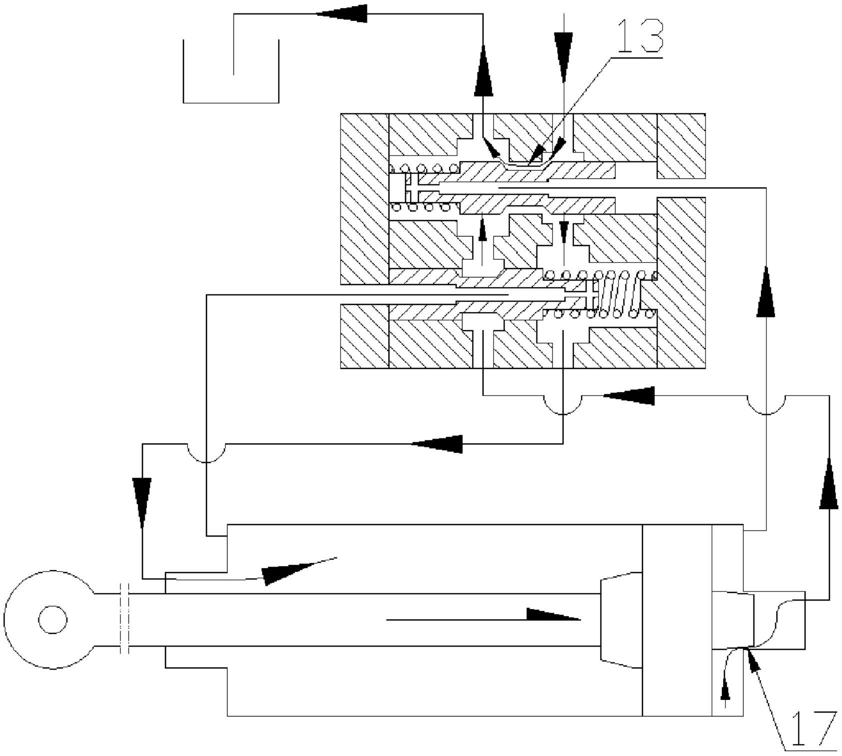
FIG. 20 is a working principle diagram of a valve trim in buffering at a cylinder bottom in FIG. 18.

FIGS. 18-20 illustrate a working principle diagram when an unloading valve at a guide sleeve and an unloading valve at a cylinder bottom are integrated. There shows a double-acting unloading valve with two valve trims. The double-acting unloading valve can control buffering and unloading at the guide sleeve and the cylinder bottom to realize two-way unloading and buffering of the cylinder. FIG. 18 illustrates a normal flow state of oil when the piston moves toward the guide sleeve.

FIG. 19 illustrates a working principle diagram when the piston, as shown in FIG. 18, moves close to the end of travel and the buffer stopper enters the buffer chamber for buffering. The buffer stopper enters the buffer chamber to form oil return throttling. The pressure in the oil return chamber rises. Pressurized oil in the oil return chamber enters the driving chamber of the corresponding valve trim, thereby driving the valve trim to move to the spring chamber. Consequently, the unloading groove of the valve trim communicates with the spring chamber. The pressurized oil in the oil inlet chamber can be unloaded by communicating the unloading groove of the valve trim and the spring chamber with the oil tank. The buffering principle is the same as the above, and will not be repeated herein.

FIG. 20 illustrates a buffering principle diagram when the piston moves reversely to the cylinder bottom upon completion of the buffering in FIG. 18. The corresponding valve trim at the cylinder bottom operates to realize the unloading and buffering at the cylinder bottom. The buffering principle is the same as FIG. 7 in Embodiment 3 and will not be repeated herein.

Embodiment 10

Figure 21:
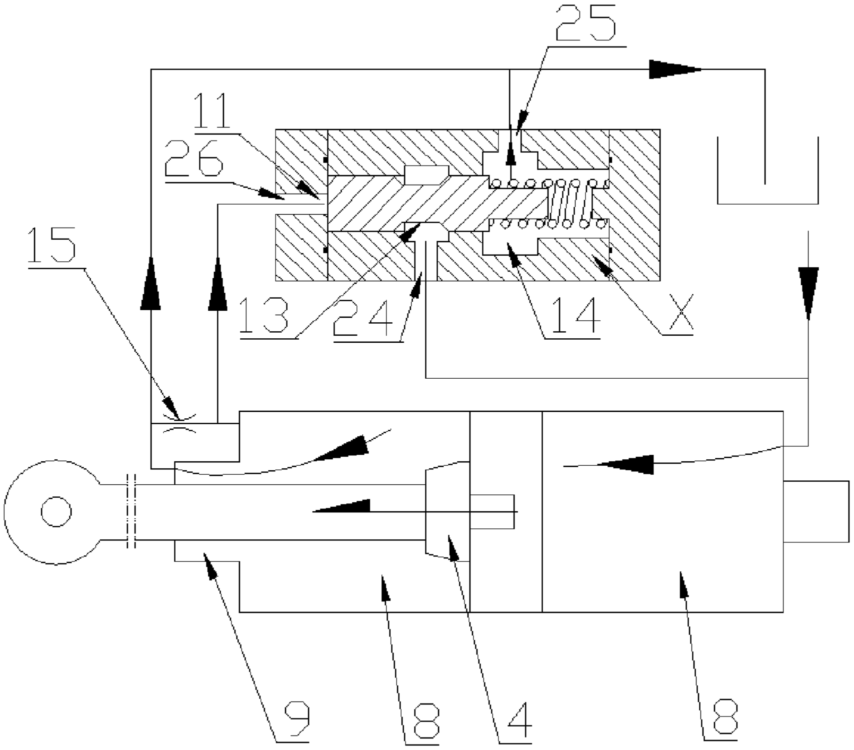
FIG. 21 is a first schematic structural view according to Embodiment 10.
Figure 22:
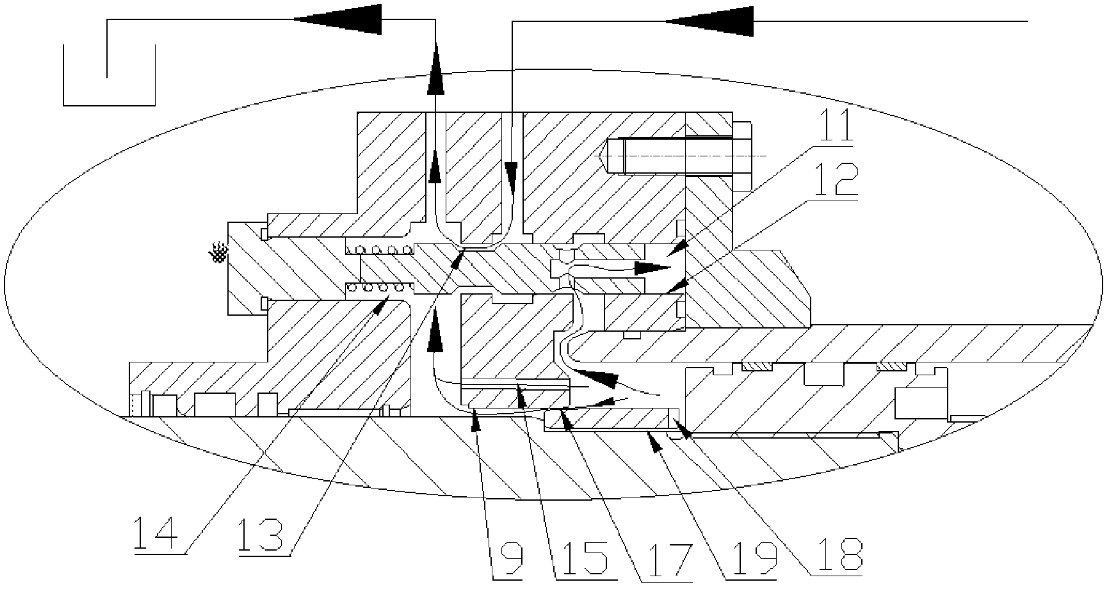
FIG. 22 is a second schematic structural view according to Embodiment 10.

The damping hole 15 can be provided flexibly as required. It may be provided on the valve trim of the unloading valve, as shown by the above embodiments, and may also be provided on other components such as the guide sleeve, the cylinder bottom, or the oil conduit. With FIGS. 21-22 as an example, FIG. 21 illustrates that the working principle is unchanged when the damping hole in FIG. 17 is moved from the valve trim to other positions on the oil conduit, and FIG. 22 illustrates that the damping hole in FIG. 4 is moved from the valve trim to the guide sleeve. The damping hole has the same effect as a buffering-throttling hole of a buffer cylinder in the prior art, which will not be repeated.

Embodiment 11

Figure 23:
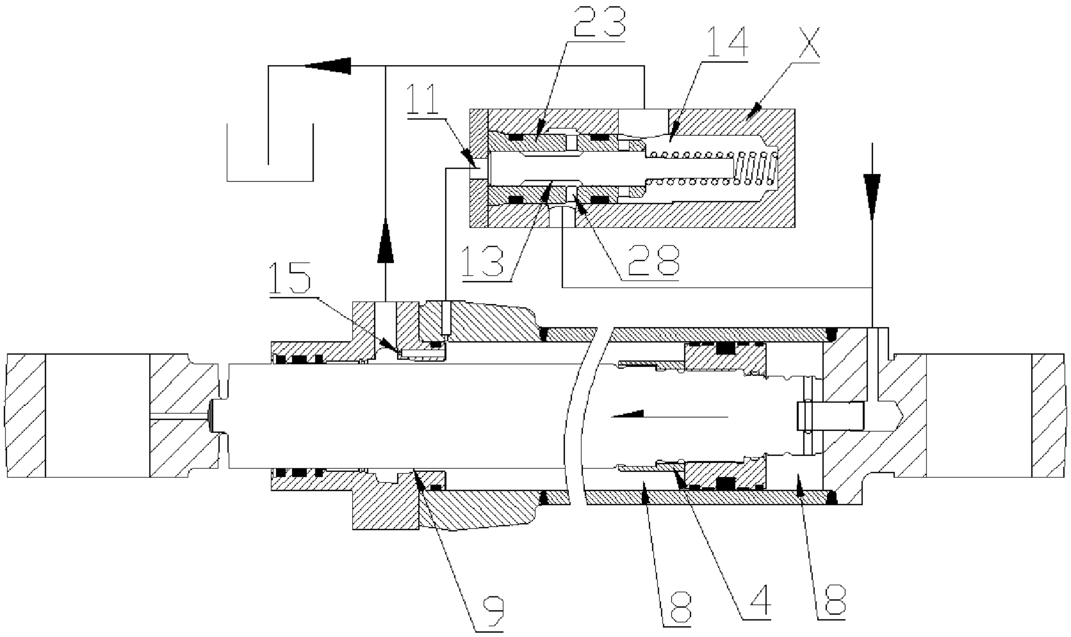
FIG. 23 is a first schematic structural view according to Embodiment 11.
Figure 24:
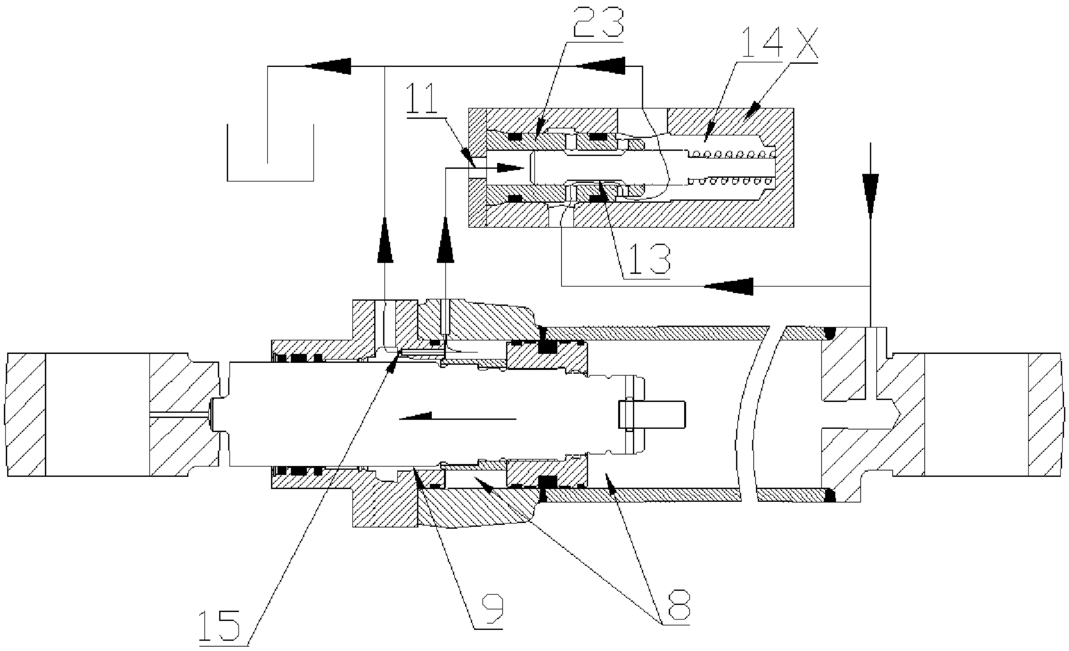
FIG. 24 is a second schematic structural view according to Embodiment 11.

The unloading valve may further be a cartridge valve and is inserted into a component of the cylinder or a member of the oil conduit. FIGS. 23-24 illustrate the structure of the cartridge valve. A valve sleeve is provided. The valve trim is fit and provided in the valve sleeve. The valve trim is located and assembled on the cylinder through the valve sleeve. Oil passage V 28 is further formed in the valve sleeve. Through cooperation between the oil passage V and the unloading groove of the valve trim, the unloading function of the unloading valve is realized. FIGS. 23-24 illustrate a working state and a working principle of the cartridge valve in a normal working state and a buffering state of the cylinder by taking the buffering of the cylinder at the guide sleeve as an example. The working mechanism is the same as the above and will not be repeated herein.

Embodiments 1-11 are merely preferred structural examples. Various embodiments may be achieved based on FIGS. 1-24 and Embodiment 1-11 and will not be listed herein.

It should be noted that the foregoing are merely descriptions of preferred embodiments of the present disclosure, but the protection scope of the present disclosure is not limited thereto. Various changes can further be made as required. For example, changes can be made to the arrangement of the combined valve, combination, installation, and position of the unloading valve, structures of the valve trim and the valve orifice, arrangement of the buffer chamber, the buffer stopper, and the throttling groove, the oil opening, and the oil passage of the unloading valve (position, direction, shape, form, and the like), shape, position and quantity of the unloading groove of the valve trim or the oil chamber of the valve orifice, structural form of the cylinder, and structural form of the one-way valve. The return spring and the one-way valve spring can also be made using other structures as required, provided that the valve trim can be restored. Any equivalent replacement or change made within a technical scope of the present disclosure by those skilled in the art according to the schematic views, implementation solutions, and inventive concepts of the present disclosure shall fall within the protection scope of the present disclosure.

What is claimed is:

1. An unloading valve, comprising a valve body, a valve trim, a return spring, and a damping hole, wherein a valve orifice is formed in the valve body; the valve trim is fit and provided in the valve orifice; a driving chamber of the valve trim and a spring chamber of the valve trim are respectively formed at two ends of the valve orifice; the return spring is provided in the spring chamber and comprises a first end compressed to abut against a bottom of the spring chamber and a second end compressed to abut against a first end of the valve trim; under a pushing force of the return spring, a second end of the valve trim abuts against a bottom of the driving chamber; an unloading groove is formed in the valve trim; a first oil passage and a second oil passage communicate through the unloading groove and are arranged on the valve body; a third oil passage communicating with the driving chamber is formed in the valve body; the second oil passage communicates with the spring chamber; and in a non-unloading state, the unloading groove communicates with the first oil passage, and does not communicate with the second oil passage, the spring chamber and the driving chamber;

the damping hole is formed in the valve trim, a guide sleeve, a cylinder bottom, or an oil conduit; and the driving chamber and the spring chamber communicate through the damping hole;

the unloading valve is assembled on the guide sleeve, the cylinder bottom, or the oil conduit; and the unloading valve is a cartridge valve; the unloading valve further comprises a valve sleeve; the valve trim is fit and provided in the valve sleeve, and inserted into the valve body through the valve sleeve; a fifth oil passage is formed in the valve sleeve; and the fifth oil passage is configured to cooperate with the unloading groove to realize an unloading function of the unloading valve.

2. The unloading valve according to claim 1, wherein a fourth oil passage communicating with the spring chamber is further formed in the valve body.

3. The unloading valve according to claim 2, further comprising a damping hole, wherein the damping hole is formed in the valve trim, a guide sleeve, a cylinder bottom, or an oil conduit; and the driving chamber and the spring chamber communicate through the damping hole.

4. The unloading valve according to claim 1, wherein the unloading groove comprises an annular groove around a surface of the valve trim and/or axial cutting grooves recessed along the surface of the valve trim, and the axial cutting grooves are arranged along a circumferential direction of the valve trim.

5. The unloading valve according to claim 1, wherein the unloading valve is integrated into the guide sleeve of a cylinder or the cylinder bottom.

6. A combined valve type buffer cylinder, comprising a guide sleeve, wherein the guide sleeve is in sliding fit with a piston rod; a piston is fixedly connected to the piston rod; the piston divides an inner cavity of a cylinder body into two cylinder chambers;

the combined valve type buffer cylinder further comprises combined valves; the combined valves each comprise a throttling valve and the unloading valve according to claim 1, wherein the throttling valve and the unloading valve are cooperated in use; the throttling valve comprises a buffer stopper and a buffer chamber; the buffer stopper is provided on the piston rod; the buffer chamber is formed at an end of the cylinder body; the buffer chamber serves as oil inlet and outlet channels for a first cylinder chamber at the end of the cylinder body, and communicates with the spring chamber of the unloading valve; the spring chamber communicates with a system oil conduit through the second oil passage; the driving chamber of the unloading valve communicates with the first cylinder chamber at the buffer chamber of the cylinder body through the third oil passage; and the unloading groove of the unloading valve always communicates with a second cylinder chamber through the first oil passage; and the combined valve type buffer cylinder further comprises a one-way valve, wherein the one-way valve is provided on the throttling valve; and the one-way valve comprises an oil filling gap formed between an inner hole of the buffer stopper and a mating surface of the piston rod, an end surface oil groove formed at an end of the buffer stopper toward the piston, and a one-way valve orifice composed of shoulders, wherein the shoulders are provided correspondingly on the buffer stopper and the piston rod and cooperated with each other.

7. The combined valve type buffer cylinder according to claim 6, wherein the spring chamber further communicates with the cylinder chamber at the buffer chamber of the cylinder body through a fourth oil passage.

8. The combined valve type buffer cylinder according to claim 6, wherein two combined valves are cooperatively used and respectively control buffering at two ends of the combined valve type buffer cylinder.

9. The combined valve type buffer cylinder according to claim 8, wherein the two unloading valves of the two combined valves are integrated together, and the spring chamber of the valve trim of one of the two unloading valves communicates with the unloading groove of the other one of the two unloading valves.

10. A combined valve type buffer cylinder, comprising a guide sleeve, wherein the guide sleeve is in sliding fit with a piston rod; a piston is fixedly connected to the piston rod; the piston divides an inner cavity of a cylinder body into two cylinder chambers;

the combined valve type buffer cylinder further comprises combined valves; the combined valves each comprise a throttling valve and the unloading valve according to claim 1, wherein the throttling valve and the unloading valve are cooperated in use; the throttling valve comprises a buffer stopper and a buffer chamber; the buffer stopper is provided on the piston rod; the buffer chamber is formed at an end of the cylinder body; the buffer chamber serves as oil inlet and outlet channels for a first cylinder chamber at the end of the cylinder body, and communicates with the spring chamber of the unloading valve; the spring chamber communicates with a system oil conduit through the second oil passage; the driving chamber of the unloading valve communicates with the first cylinder chamber at the buffer chamber of the cylinder body through the third oil passage; and the unloading groove of the unloading valve always communicates with a second cylinder chamber through the first oil passage;

the combined valve type buffer cylinder further comprises a one-way valve, wherein the one-way valve is provided on the valve trim; the one-way valve comprises a one-way valve trim and a one-way valve spring; a damping hole of the unloading valve is formed in the one-way valve trim; a central oil passage is formed in the valve trim; the one-way valve trim is provided at an opening of the central oil passage in the valve trim; the one-way valve spring is compressed at the bottom of the driving chamber; and in a normal state, the one-way valve trim abuts against the opening of the central oil passage under a pushing force of the one-way valve spring, and the one-way valve orifice is closed.

11. The combined valve type buffer cylinder according to claim 6, wherein a throttling groove is formed in the buffer stopper, and the throttling groove is a chamfered planar groove or a longitudinal groove along a surface of the valve trim.

12. The unloading valve according to claim 3, wherein the unloading valve is integrated into the guide sleeve of a cylinder or the cylinder bottom.

13. The unloading valve according to claim 3, wherein the unloading valve is assembled on the guide sleeve, the cylinder bottom, or the oil conduit.

14. The combined valve type buffer cylinder according to claim 6, wherein the fourth oil passage communicating with the spring chamber is further formed in the valve body.

15. The combined valve type buffer cylinder according to claim 6, further comprising a damping hole, wherein the damping hole is formed in the valve trim, a guide sleeve, a cylinder bottom, or an oil conduit; and the driving chamber and the spring chamber communicate through the damping hole.

16. The combined valve type buffer cylinder according to claim 14, further comprising a damping hole, wherein the damping hole is formed in the valve trim, a guide sleeve, a cylinder bottom, or an oil conduit; and the driving chamber and the spring chamber communicate through the damping hole.

* * * * *